(12) United States Patent
Jacobson et al.

(10) Patent No.: US 7,839,023 B2
(45) Date of Patent: Nov. 23, 2010

(54) METHODS AND APPARATUS FOR THREE-PHASE INVERTER WITH REDUCED ENERGY STORAGE

(75) Inventors: Boris S. Jacobson, Westford, MA (US); Evgeny N. Holmansky, Acton, MA (US)

(73) Assignee: Raytheon Company, Waltham, MA (US)

( * ) Notice: Subject to any disclaimer, the term of this patent is extended or adjusted under 35 U.S.C. 154(b) by 340 days.

(21) Appl. No.: 11/936,896

(22) Filed: Nov. 8, 2007

(65) Prior Publication Data

US 2009/0021081 A1 Jan. 22, 2009

Related U.S. Application Data

(60) Provisional application No. 60/950,383, filed on Jul. 18, 2007.

(51) Int. Cl.
*H02J 1/00* (2006.01)
*H02M 7/5387* (2007.01)

(52) U.S. Cl. .......................... 307/77; 307/82; 323/266; 363/43; 363/132

(58) Field of Classification Search ................ 307/77, 307/82; 323/266; 363/43, 132
See application file for complete search history.

(56) References Cited

U.S. PATENT DOCUMENTS

| | | | |
|---|---|---|---|
| 5,065,300 A | 11/1991 | Jacobson et al. | |
| 5,151,852 A | 9/1992 | Jacobson et al. | |
| 5,155,675 A * | 10/1992 | Maruyama et al. | 363/98 |
| 5,181,170 A * | 1/1993 | Huang et al. | 363/21.04 |
| 5,264,736 A | 11/1993 | Jacobson | |
| 5,265,545 A | 11/1993 | Milner | |
| 5,361,196 A * | 11/1994 | Tanamachi et al. | 363/41 |
| 5,459,655 A * | 10/1995 | Mori et al. | 363/132 |
| 5,638,263 A | 6/1997 | Opal et al. | |
| 5,986,909 A | 11/1999 | Hammond et al. | |
| 6,005,788 A | 12/1999 | Lipo et al. | |
| 6,236,580 B1 | 5/2001 | Aiello et al. | |
| 6,337,804 B1 * | 1/2002 | Kea et al. | 363/132 |
| 6,424,552 B1 | 7/2002 | Jacobson | |
| 6,700,804 B1 * | 3/2004 | Reichard | 363/51 |
| 6,795,323 B2 * | 9/2004 | Tanaka et al. | 363/41 |
| 6,856,283 B2 | 2/2005 | Jacobson et al. | |
| 6,873,138 B2 | 3/2005 | Jacobson | |
| 6,952,153 B2 | 10/2005 | Jacobson et al. | |
| 7,102,321 B2 * | 9/2006 | Edwards et al. | 318/400.26 |
| 7,145,268 B2 * | 12/2006 | Edwards et al. | 307/127 |

(Continued)

OTHER PUBLICATIONS

Notification of Transmittal of the International Search Report and the Written Opinion of the International Searching Authority, or the Declaration, the International Search Report and the Written Opinion of the International Searching Authority, PCT/US2008/067083 dated Feb. 12, 2009.

(Continued)

*Primary Examiner*—Hal I Kaplan
(74) *Attorney, Agent, or Firm*—Daly, Crowley, Mofford & Durkee, LLP

(57) ABSTRACT

Methods and apparatus for a circuit including first and second energy sources, a rectifier coupled to the first and second energy sources, first and second energy storage devices coupled end-to-end across the positive and negative rails, and a single three-level inverter coupled to the rectifier for providing three-phase sinusoidal output voltages.

28 Claims, 9 Drawing Sheets

U.S. PATENT DOCUMENTS

| | | | |
|---|---|---|---|
| 7,219,673 B2* | 5/2007 | Lemak | 363/71 |
| 7,285,816 B2 | 10/2007 | Bonanomi | |
| 7,495,938 B2* | 2/2009 | Wu et al. | 363/40 |
| 7,638,904 B2* | 12/2009 | Shoji et al. | 307/154 |
| 2004/0125523 A1 | 7/2004 | Edwards et al. | |
| 2005/0111246 A1 | 5/2005 | Lai et al. | |
| 2005/0284673 A1 | 12/2005 | Nakazawa et al. | |
| 2008/0280175 A1* | 11/2008 | Gurunathan et al. | 429/23 |
| 2009/0021966 A1 | 1/2009 | Jacobson et al. | |

OTHER PUBLICATIONS

Fang Zheng Peng et al: "A multilevel voltage-source converter system with balanced DC voltages", Power Electronics Specialists Conference, 1995. PESC '95 Record., $16^{th}$ Annual IEEE Atlanta, GA, USA Jun. 18-22, 1995, New York, NY, USA, IEEE, US, vol. 2, Jun. 18, 1995, pp. 1144-1150, XP010150694. ISBN: 978-0-7803-2730-6, paragraph [II.A], table 1.

Shuai Lu et al: "Advanced Control and Analysis of Cascaded Multilevel Converters Based on P-Q Compensation" IEEE Transactions on Power Electronics, IEEE Service Center, Piscataway, NJ, US, vol. 22, No. 4, Jul. 1, 2007, pp. 1242-1252, XP011186930, ISSN: 0885-8993, paragraph [00II], figure 1, figure 5, figure 7 and figure 17.

Raju N R et al: "Harmonic cancellation for a twelve-pulse rectifier using DC bus modulation", Conference Record of the 2002 IEEE Industry Applications Conference. $37^{TH}$ IAS Annual Meeting. Pittsburgh, PA, Oct. 13-18, 2002; [Conference Record of the IEEE Industry Appliations Conference. IAS Annual Meeting], New York, NY: IEEE, US, vol. 4, Oct. 13, 2002, pp. 2526-2529, XP010609944, ISBN: 978-0-7803-7420-1, p. 2527, right-hand column, figure 4 and figure 6.

G. Gong, H. Ertl and J.W. Kolar, A Multi-Cell Cascaded Power Amplifier, 2006, pp. 1550-1556.

Kuniomi Oguchi and Elichi Ikawa and Yoshitaka Tsukiori, A Three-Phase Sine Wave Inverter System Using Multiple Phase-Shifted Single-Phase Resonant Inverters, 1990, pp. 1125-1131, Kyocera Co. Ltd., Tokyo, Japan.

Kuniomi Oguchi and Elichi Ikawa, A Three-Phase Dual-Inverter System with High Frequency Links and Sinusoidal Current Outputs, Nov. 1991, pp. 601-607, Faculty of Engineering, Ibaraki Univeristy, Japan.

Kuniomi Oguchi and Elichi Ikawa and Yoshitaka Tsukiori, A Three-Phase Sine Wave Inverter System Using Multiple Phase-Shifted Singe-Phase Resonant Inverters, Nov./Dec. 1993, pp. 1076-1083, vol. 29, No. 6.

Notification Concerning Transmittal of International Preliminary Report on Patentability (Chapter 1 of the Patent Cooperation Treaty) dated Jan. 28, 2010, PCT/US2008/067083.

International Preliminary Report of Patentability (Chapter 1 of the Patent Cooperation Treaty) dated Jan. 19, 2010, PCT/US2008/067083.

Notification of Transmittal of the International Search Report and the Written Opinion of the International Searching Authority, or the Declaration, PCT/US2008/070108 dated Jun. 16, 2010, 5 pages.

Written Opinion of the International Searching Authority, PCT/US2008/070108 dated Jun. 16, 2010, 15 pages.

Notification Concerning Transmittal of Copy of International Preliminary Report on Patentability (Chapter 1 of the Patent Cooperation Treaty), PCT/US2008/070108 dated Jun. 24, 2010, 15 pages.

Jung-Won Kim et al.: "Modeling, Control, and Design of Input-Series-Output-Parallel-Connected Converter for High-speed-Train Power System", IEEE Transactions on Industrial Electronics, IEEE Service Center, Piscataway, NJ, USA, vol. 48, No. 3, Jun. 1, 2001, XP011023828, 9 pages.

Olivereira J.D.S. et al.: "A Lossless Commutation PWM Two Level Forward Converter Operating Like A Full-Bridge", Applied Power Electronics Conference and Exposition, 2000, APEC 2000. Fifteenth Annual IEEE, vol. 1, Feb. 6, 2000, 6 pages.

H. J. McCreary: "The Magnetic Cross Valve", AIEE Transactions of the American Institute of Electrical Engineers, vol. 70, No. 2, Jul. 1951, XP002584373, USA, DOI: 10.1109/T-AIEE.1951.5060643. Retrieved from the Internet: http://ieeexplore.ieee.org/stamp/stamp.jsp?tp=&arnumber=5060643>, 8 pages.

Krishnamurthy H.K. et al.,: "Building Block Converter Module for Universal (AC-DC, DC-AC, DC-DC) Fully Modular Power Conversion Architecture", Power Electronics Specialists Conference, 2007. PESC 2007. IEEE, IEEE, Piscataway, NJ, USA, Jun. 17, 2007, XP031218336, ISBN: 978-1-4244-0654-8, 7 pages.

Jian Wang, Longyun Kang, Binggang Cao and Daming Xu, Energy Complementary Control of a Distributed Power Generation System Based on Renewable Energy, Sep. 2004, pp. 136-140, IEEE 0-7803-8386.

Vijay Choudhary, Enrique Ledezma, Raja Ayyanar and Robert M. Button, Fault Tolerant Circuit Topology and Control Method for Input-Series and Output-Parallel Modular DC-DC Converters, Jan. 2008, pp. 402-411, IEEE Transactions on Power Electronics, vol. 23, No. 1, IEEE 0885-8993.

U.S. Appl. No. 12/170,498, filed Jul. 10, 2008, file through Aug. 25, 2010, 201 pages.

* cited by examiner

METHODS AND APPARATUS FOR THREE-PHASE INVERTER WITH REDUCED ENERGY STORAGE

CROSS REFERENCE TO RELATED APPLICATIONS

The present application claims the benefit of U.S. Patent Application No. 60/950,383, filed on Jul. 18, 2007, which is incorporated herein by reference.

STATEMENT REGARDING FEDERALLY SPONSORED RESEARCH

The Government may have certain rights in the invention pursuant to Contract No. N00014-05-C-0202 and CREE Subcontract No 06-003.

BACKGROUND

As is known in the art, pulse-width modulated (PWM) inverters are conventionally employed for DC/AC (direct current/alternating current) power conversion applications. If an application requires galvanic isolation and/or voltage transformation, an isolated, high frequency DC/DC converter is conventionally added as inverter front end. Two power conversion stages along with extra DC link energy storage components result in significantly increased size and weight of such systems. Other drawbacks of conventional systems are low efficiency and high EMI emissions typical for hard-commutated PWM inverters.

Various embodiments of quasi-single-stage, high-frequency link, single-phase inverters have attempted to overcome the drawbacks of conventional, two-stage systems. These quasi-single-stage inverters utilize an isolated DC/DC converter to generate a sine wave modulated DC output voltage or current. The modulated DC waveform is then converted into AC by a low frequency unfolding inverter. By eliminating large DC link energy storage components and high-frequency switching in the unfolding inverter significant improvements in weight, size, efficiency, and EMI can be achieved. However, three-phase implementation of known quasi-single-stage, high-frequency link inverters is much less advantageous, since it requires three isolated DC/DC converters and three single-phase unfolding inverters.

SUMMARY

The present invention provides methods and apparatus for a three-phase inverter having reduced energy storage requirements. With this arrangement, an inverter does not require high frequency switching or energy storage at the DC link for a compact design while providing a three-phase sinusoidal output by utilizing a single unfolding inverter.

In one aspect of the invention, a circuit includes first and second energy sources coupled in series and having a positive rail, a negative rail, and a neutral, first and second energy storage devices coupled to the first and second energy sources, and a single multi-level inverter coupled to the positive rail, negative rail, and neutral for providing three-phase sinusoidal output voltages.

In another aspect of the invention, a method includes generating first and second modulated DC waveforms, with each segment of the modulated waveforms corresponding to a specific 60° segment of the fundamental frequency sinusoid, and then unfolding and summing the modulated DC waveforms using a three-level, three-phase inverter utilizing a specific switching scheme for the inverter switches.

BRIEF DESCRIPTION OF THE DRAWINGS

The foregoing features of this invention, as well as the invention itself, may be more fully understood from the following description of the drawings in which.

DETAILED DESCRIPTION

In general, the present invention provides a high-frequency linked three-phase inverter topology that is efficient, e.g., may exceed 99%, compact, low weight, and easily controlled. Unlike conventional three-phase PWM inverters, the inventive low frequency inverter embodiments do not use high frequency switching or energy storage at the DC link. Exemplary embodiments of the invention utilize modulated DC voltages generated by two DC energy sources and unfolded by a three-level, three-phase inverter to generate three-phase, sinusoidal output. Exemplary embodiments of the invention include embodiments where the three-phase sinusoidal outputs can be at frequencies of approximately 50 Hz, 60 Hz, or 400 Hz and embodiments where the frequency of the three-phase output signals varies from zero to a predetermined maximum frequency.

Before describing the invention in detail some introductory material is provided. In K. Oguchi, E. Tsukiori, "A Three-Phase Sine Wave Inverter System Using Multiple Phase-Shifted Single-Phase Resonant Inverters," IEEE Transactions on Industry Applications, vol. 29, No. 4, pp. 1076-1083, November/December 1993 (hereinafter Oguchi), which is incorporated herein by reference, there is described two implementations of a three-phase quasi-single-stage, high-frequency link inverters. The schemes employ two isolated resonant DC/DC converters, referred to as "multiple phase-shifted single-phase resonant inverters," to generate two modulated, non-sinusoidal DC output voltages (currents). These modulated DC waveforms are unfolded by two three-phase, low frequency inverters and then summed to produce sinusoidal three-phase voltages (currents).

Figure 1:
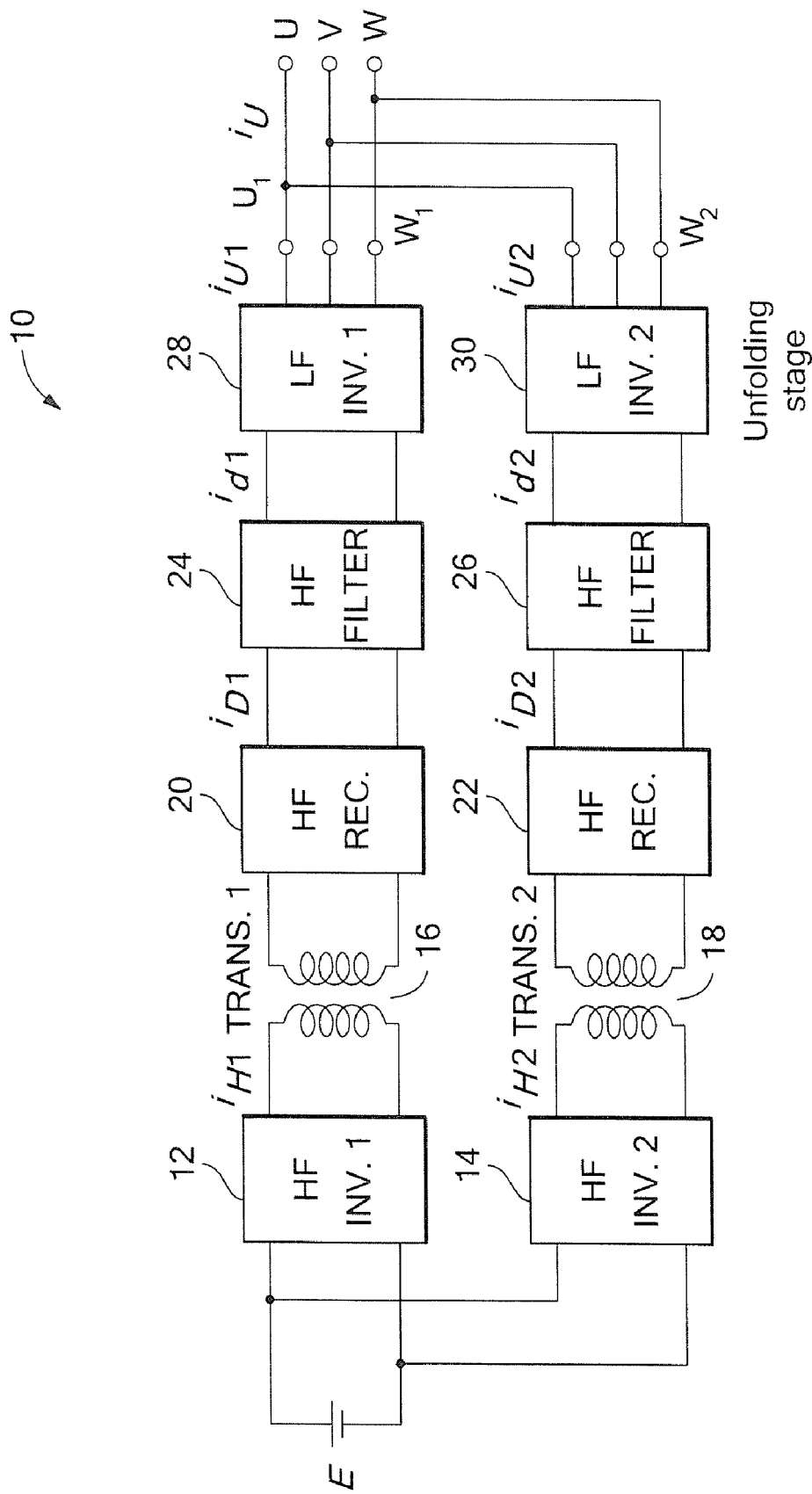
FIG. 1 is a schematic depiction of a prior art inverter.

FIG. 1 shows a prior art three-phase quasi-single stage, high frequency link inverter 10. First and second high frequency (HF) inverters 12, 14 provide, via first and second isolation transformers 16, 18, amplitude-modulated high frequency outputs to respective first and second high frequency rectifiers 20, 22. The rectifier outputs are filtered by respective first and second high frequency filters 24, 26 and converted to alternating currents by first and second low frequency inverters 28, 30.

Figure 2:
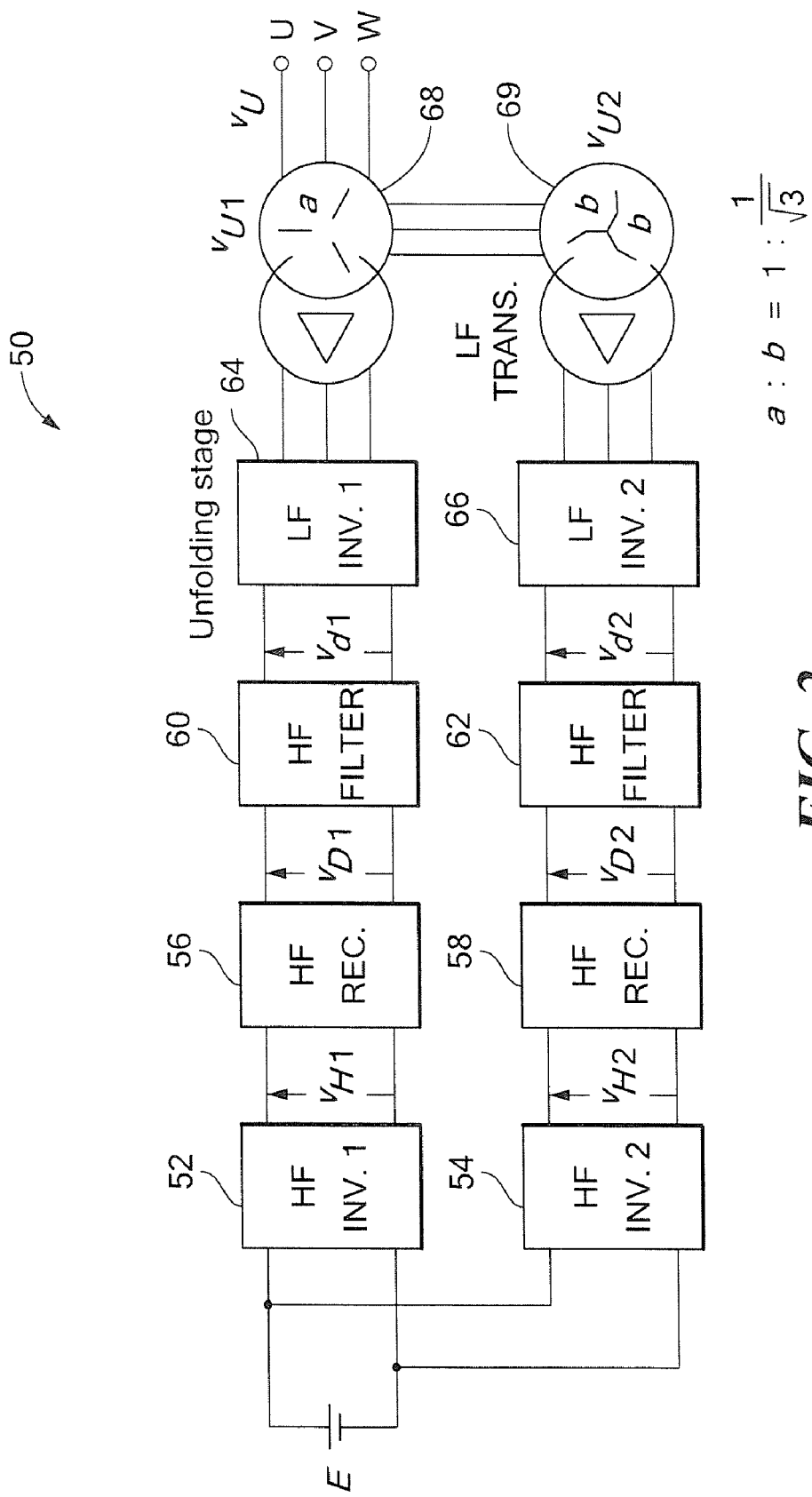
FIG. 2 is a further schematic depiction of a prior art inverter.

FIG. 2 shows a second prior art inverter 50 having some similarity with the inverter 10 of FIG. 1 except for the isolation/summing transformers. High frequency outputs of inverters 52, 54 are rectified by rectifiers 56, 58 and filtered by high frequency filters 60, 62. The filtered signals are converted to alternating currents/voltages by respective low frequency inverters 64, 66 and then summed by low frequency transformers 68, 69.

Figure 3:
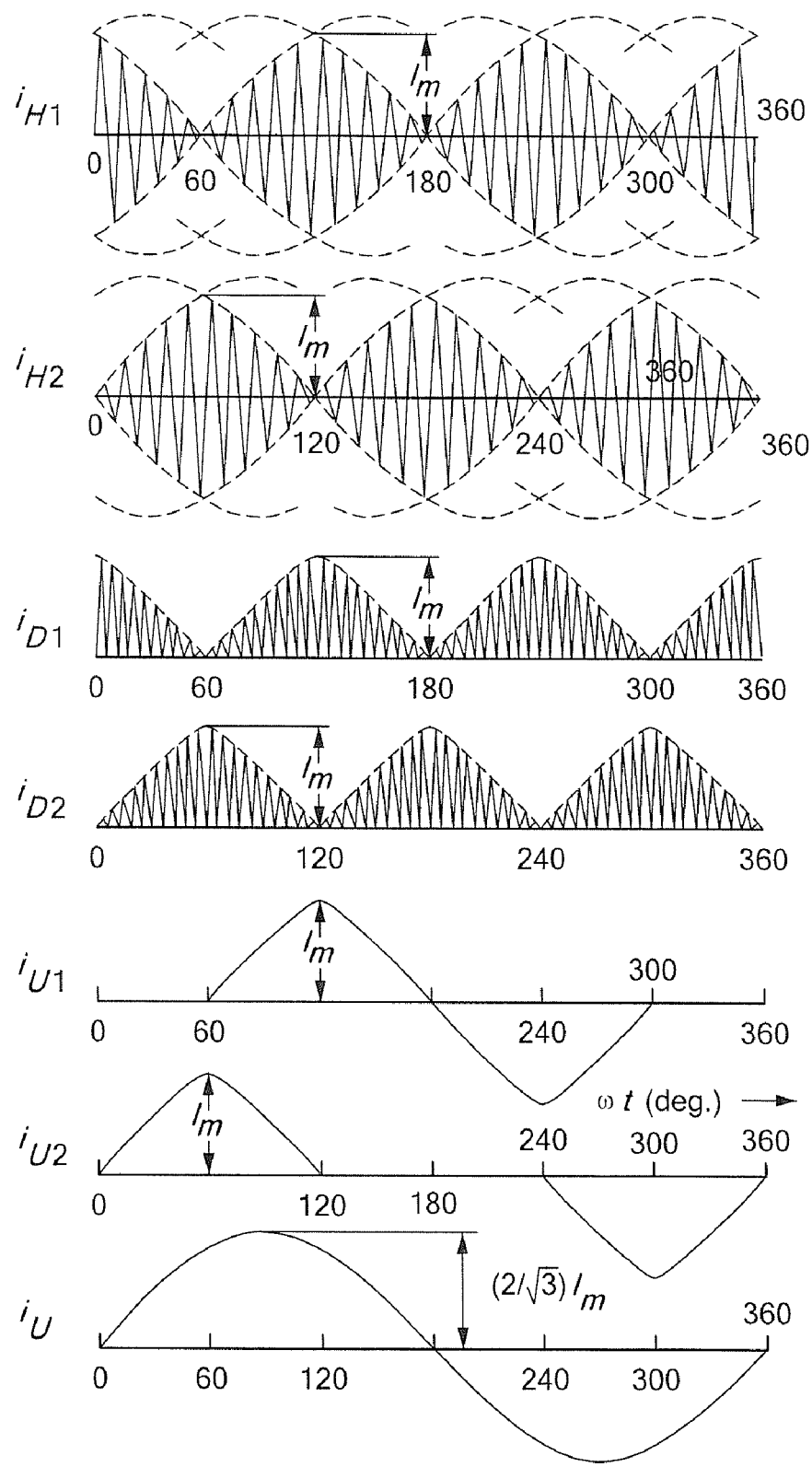
FIG. 3 is a waveform diagram showing signals for the prior art inverter of FIG. 1.
Figure 4:
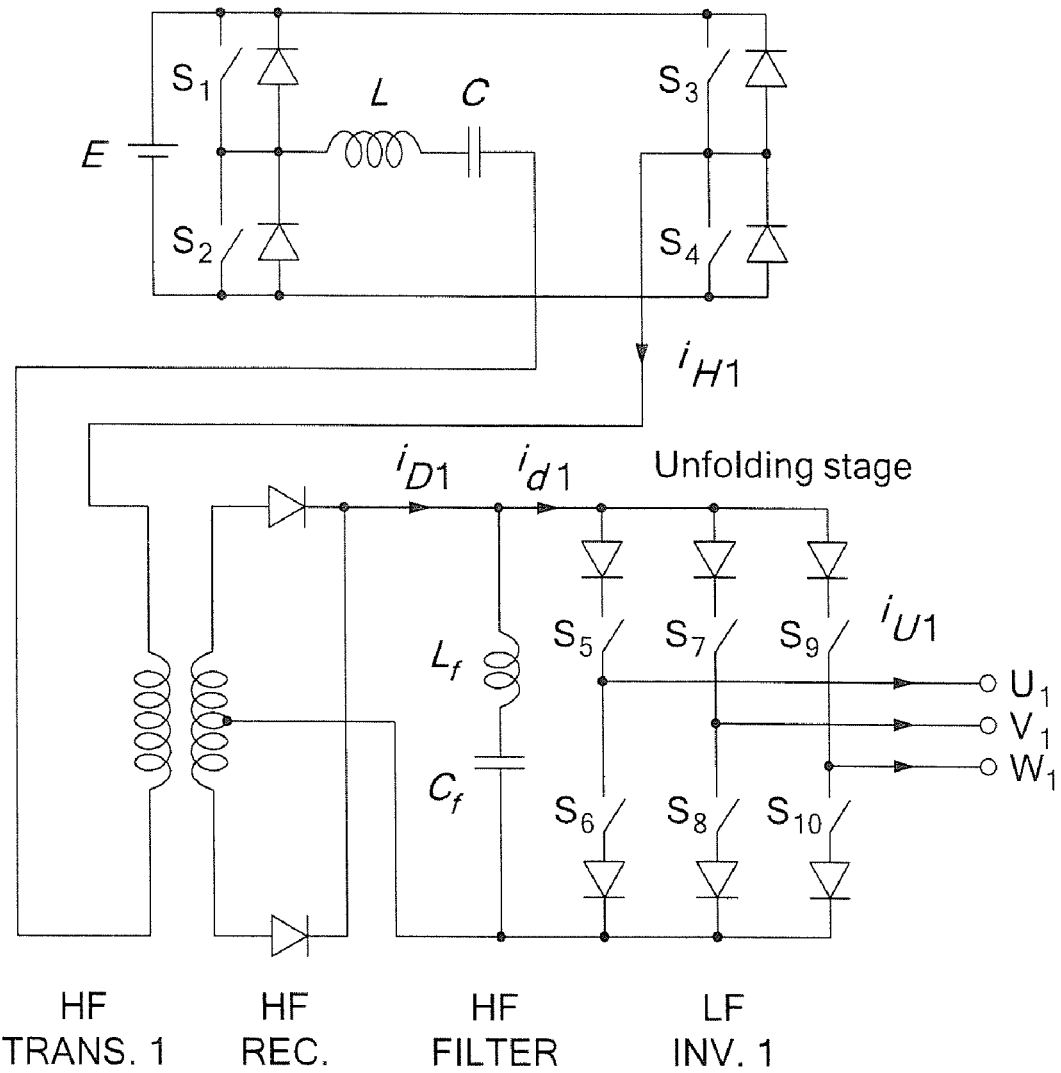
FIG. 4 is a circuit diagram of a unit of the prior art inverter of FIG. 1.

Waveforms in FIG. 3 show operation of the inverter 10 of FIG. 1, which is referred to herein as a "120° type" since two modulated DC link currents $i_{D1}$, $i_{D2}$ have a period of 120°. The high-frequency single-phase inverter generates current $i_H$ that is amplitude-modulated. The output is rectified to become $i_D$ and then is filtered to form the input DC current $i_d$ for an unfolding three-phase inverter. The resulting output current $i_U$ is obtained as follows:

$$0° \leq \omega t \leq 60°$$

$$i_U = i_{U2} = (2/\sqrt{3})I_m \sin \omega t$$

$$60° \leq \omega t \leq 120°$$

$$i_U = i_{U1} + i_{U2} = (2/\sqrt{3})I_m \sin(\omega t - 60°) + (2/\sqrt{3})I_m \sin(\omega t - 60°) = (2/\sqrt{3})I_m \sin \omega t$$

$$120° \leq \omega t \leq 180°$$

$$i_U = i_{U1} = (2/\sqrt{3})I_m \sin \omega t$$

where $\omega$ is the angular frequency of the fundamental output, and $I_m$ is the amplitude of inverter output phase current. Thus, the resulting output current $i_U$ is shown to be a sine wave. It can easily be shown that the currents of the two phases $i_V$ and $i_W$ are also sinusoidal. FIG. 4 shows an example of a circuit implementation for one unit of the inverter 10 of FIG. 1

It should be noted that the system is only applicable to a current source output because the resulting outputs are obtained from a direct summation of unit outputs.

Figure 5:
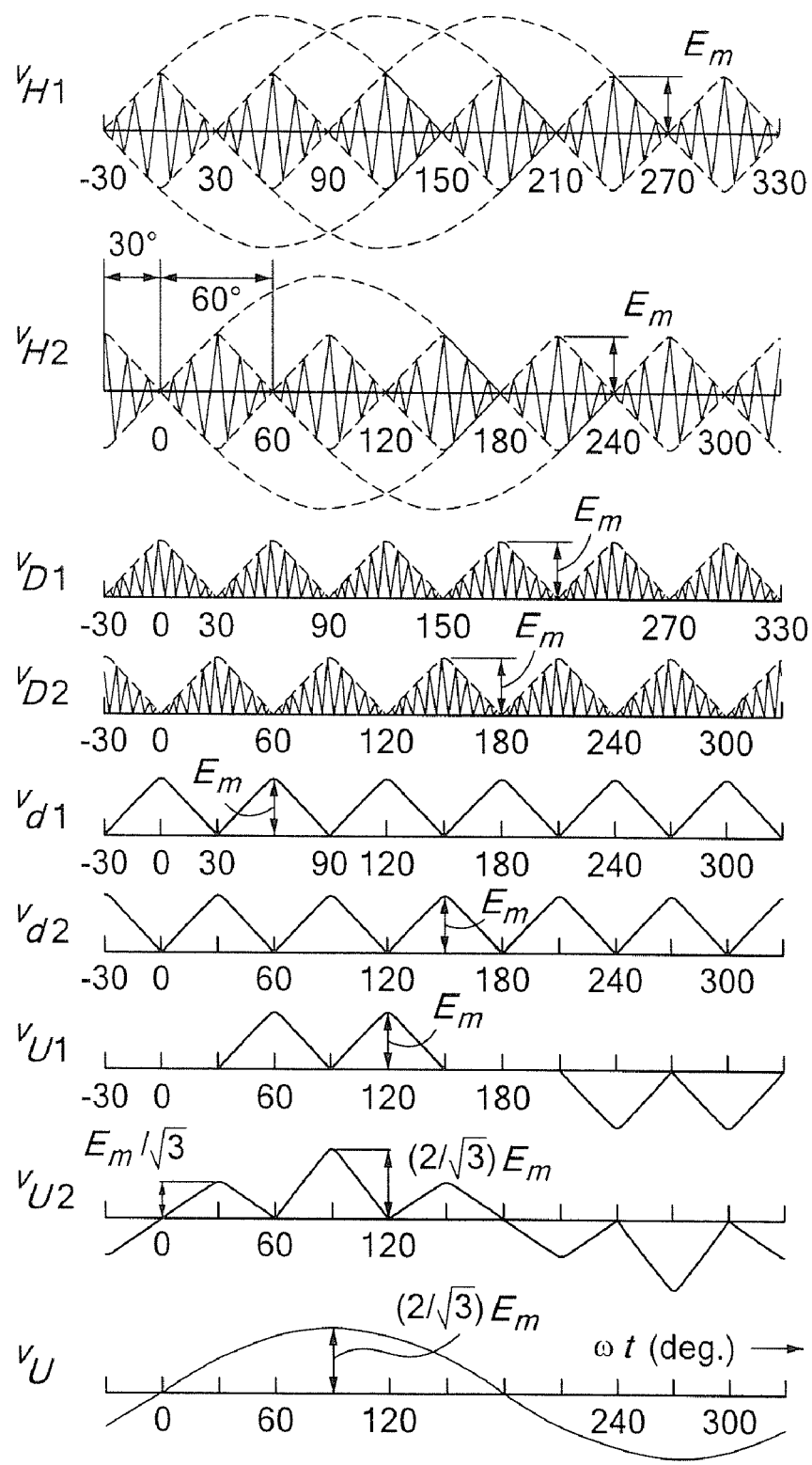
FIG. 5 is a waveform diagram for the prior art inverter of FIG. 2.
Figure 6:
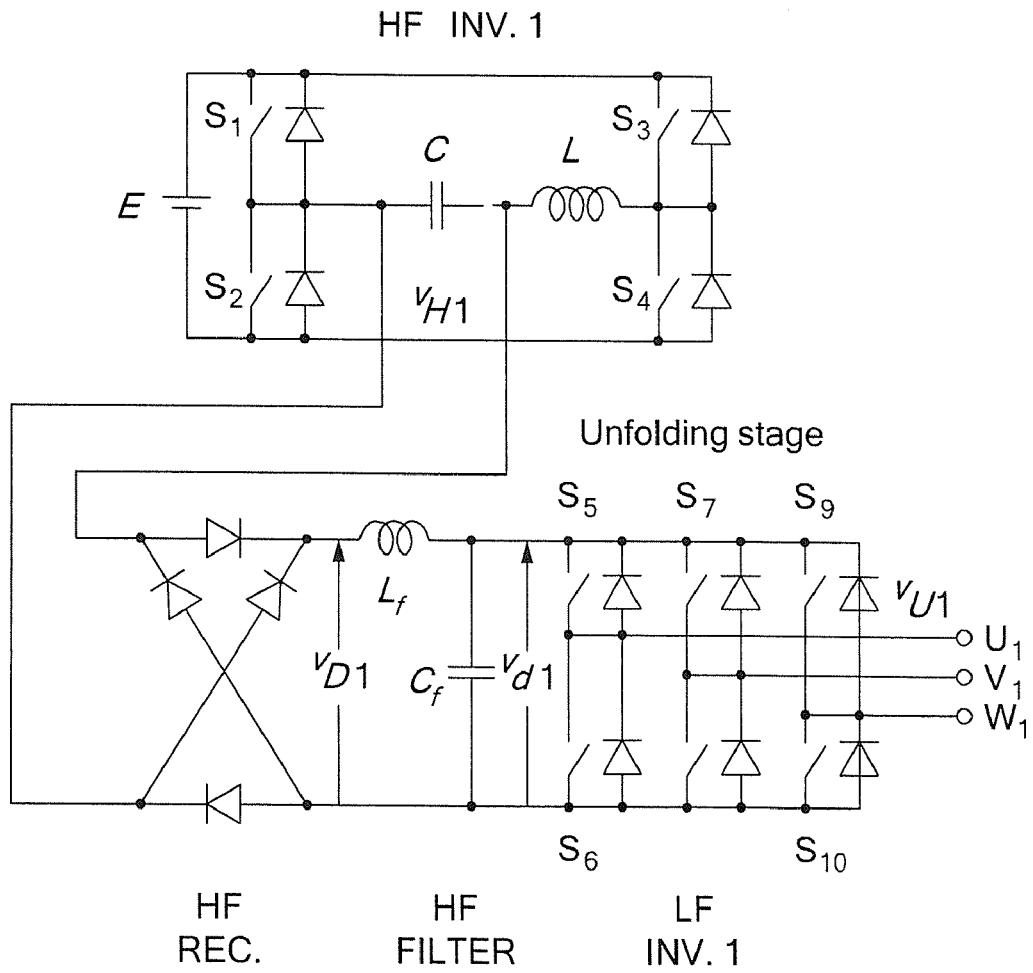
FIG. 6 is a circuit diagram of a unit of the prior art inverter of FIG. 2.

Waveforms in FIG. 5 show operation of the inverter 50 of FIG. 2, which is referred to herein as a "60° type", since two modulated DC link voltages have a period of 60°. Each output of the two units is summed with the output transformers. It can easily be shown that the resulting output waveform is sinusoidal:

$$0° \leq \omega t \leq 30°$$

$$v_U = v_{U2} = (2/\sqrt{3})E_m \sin \omega t$$

$$30° \leq \omega t \leq 60°$$

$$v_U = v_{U1} + v_{U2}$$
$$= (2/\sqrt{3})E_m \sin(\omega t - 30°) + (2/\sqrt{3})I_m \sin(\omega t + 120°)$$
$$= (2/\sqrt{3})E_m \sin \omega t 60° \leq \omega t \leq 90°$$

$$v_U = v_{U1} + v_{U2}$$
$$= 2E_m \sin(\omega t + 90°) + (4/\sqrt{3})E_m \sin(\omega t - 60°)$$
$$= (2/\sqrt{3})E_m \sin \omega t$$

where $E_m$ is the amplitude of inverter output phase voltage. Note that the inverter 50 of FIG. 2 is applicable to either a voltage or a current source, because the outputs of the two units are combined by two output transformers. FIG. 6 shows an exemplary circuit implementation for one unit of the inverter of FIG. 2

Significant drawbacks of the known three-phase inverters 10, 50 described above are present as a result of the schemes used for the summation of the modulated voltages or currents. The 120 degree type uses direct summation of the modulated currents to obtain a three-phase, sinusoidal output. While it may be simple, this technique is applicable only to current source inverters, which significantly limits its use.

The 60 degree scheme is applicable to both voltage and current source inverters but it requires two low-frequency transformers, which practically negates the advantages of the high-frequency link approach.

Figure 7:
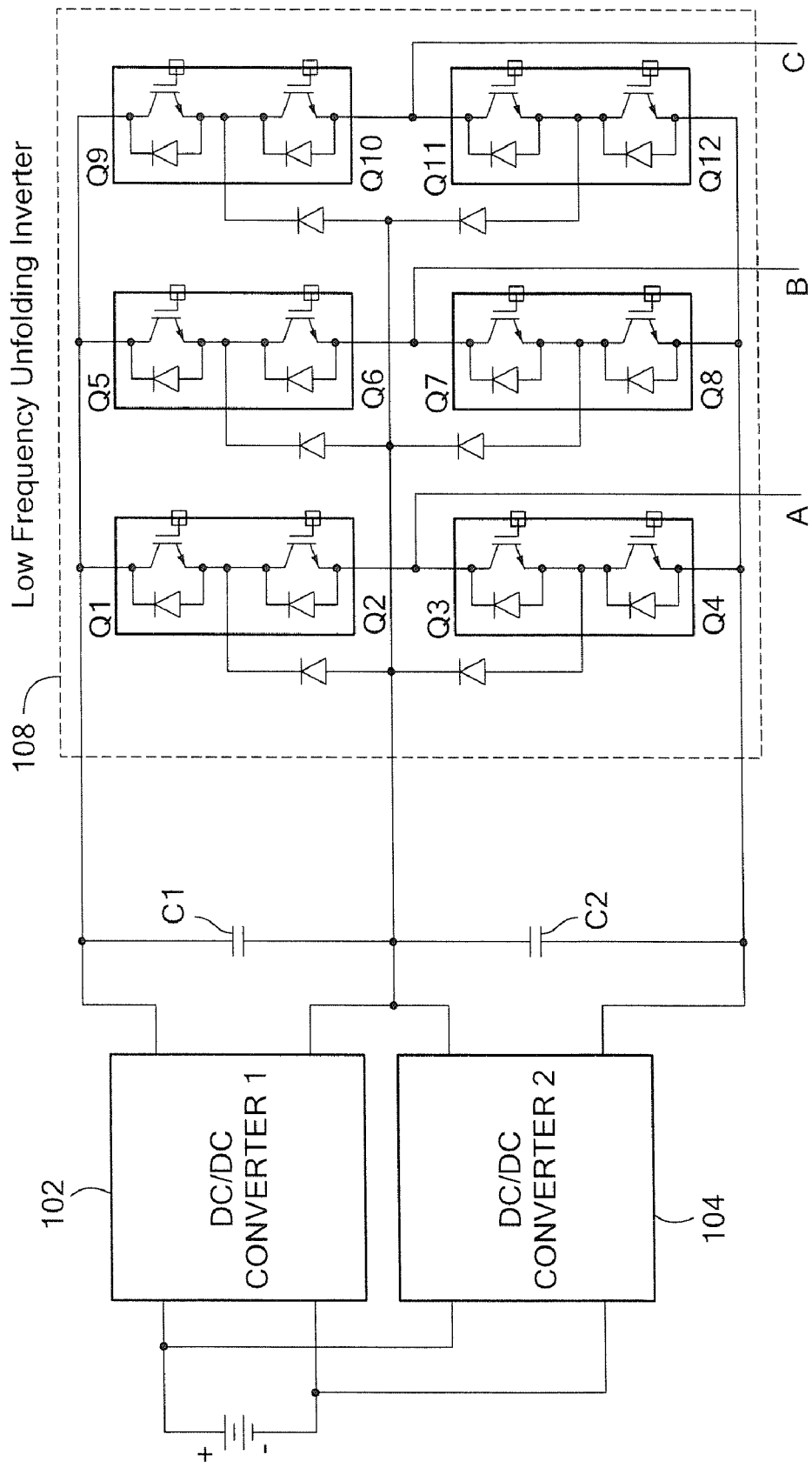
FIG. 7 is a schematic representation of a high-frequency linked inverter in accordance with exemplary embodiments of the invention.

FIG. 7 shows an exemplary embodiment of a high-frequency linked three-phase inverter 100 in accordance with exemplary embodiments of the invention. First and second high-frequency, isolated DC-DC converters 102, 104 work as current sources to generate two modulated DC voltage waveforms on first and second capacitors C1, C2.

In the exemplary embodiment of FIG. 7, two current source DC-DC converters are coupled in series to form a positive rail, a negative rail, and a neutral.

In the illustrated embodiment, first capacitor $C_1$ is coupled end-to-end across the positive rail and the neutral; second capacitor $C_2$ is coupled end-to-end across the negative rail and the neutral.

The voltage waveforms are then unfolded and summed by a three-level inverter 108 switched at 60 Hz to produce 60 Hz, three-phase output voltages.

The inverter 108 coupled to the positive rail, negative rail, and neutral and includes twelve switches Q1-Q12 with four switches coupled end-to-end for each leg A, B, C of the inverter. It is understood that multi-level inverters are well known to one of ordinary skill in the art.

Figure 8:
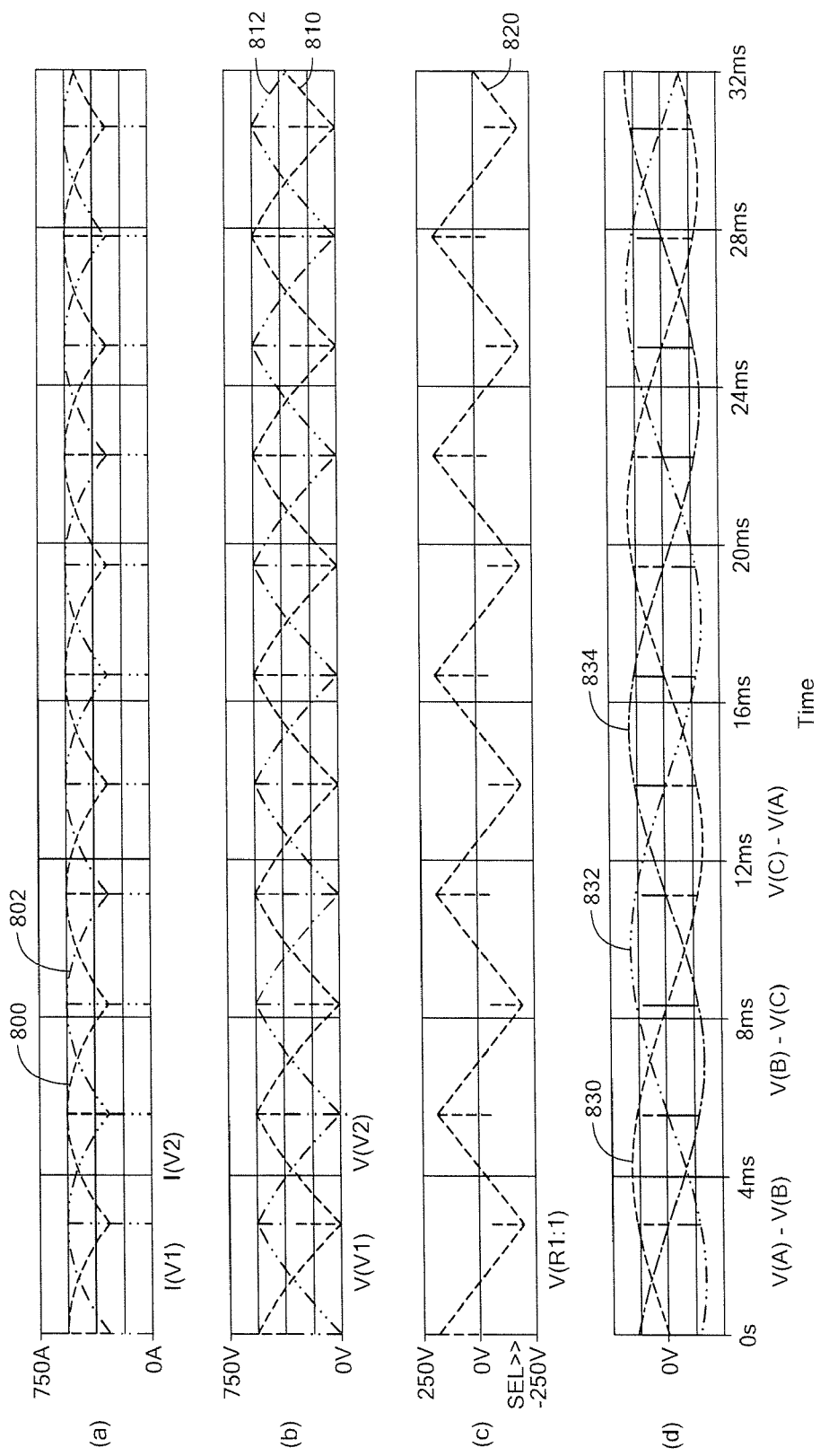
FIG. 8 is a waveform diagram showing modulated DC and output AC voltages for the inverter of FIG. 7.

FIGS. 8a-d show waveforms for operation of the inverter 100 of FIG. 7. FIG. 8a shows the first current source DC-DC converter current 800 and the second current source DC-DC converter current 802. FIG. 8b shows the first capacitor voltage 810 and the second capacitor voltage 812. FIG. 8c shows the inverter neutral voltage 820 referenced to ground. FIG. 8d shows the three phase output voltages 830, 832, 834. Each segment of the modulated waveforms 810, 812 corresponds to a specific 60° segment of the 60 Hz sinusoid. The two modulated waveforms are phase-shifted relative to each other by 60° of the 60 Hz cycle. Table 1 shows the definition of the modulated waveforms for each 60° segment of the 360° cycle.

| | ωt | | | | | |
|---|---|---|---|---|---|---|
| | 0-60° | 60°-120° | 120°-180° | 180°-240° | 240°-300° | 300°-360° |
| $V_{C1}$ | $V_m\sin(\omega t + 120°)$ | $V_m\sin(\omega t - 60°)$ | $V_m\sin(\omega t)$ | $-V_m\sin(\omega t)$ | $V_m\sin(\omega t - 120°)$ | $V_m\sin(\omega t + 60°)$ |
| $V_{C2}$ | $V_m\sin(\omega t)$ | $V_m\sin(\omega t + 60°)$ | $V_m\sin(\omega t - 120°)$ | $V_m\sin(\omega t - 60°)$ | $V_m\sin(\omega t + 120°)$ | $-V_m\sin(\omega t)$ | where ω is the angular frequency of the fundamental output, $V_{C1}$ and $V_{C2}$ are voltages across the first and second capacitors, and $V_m$ is an amplitude of the inverter output line-to-line voltages.

The resulting 60 Hz voltages 830, 832, 834 are purely sinusoidal and are described by the following functions:

$0° \leq \omega t \leq 60°$:

$$V_{AB} = V_{C2} = V_m * \sin(\omega t),$$

where Vm is the amplitude of the inverter output line-to-line voltage;

$60° \leq \omega t \leq 120°$:

$$V_{AB} = V_{C1} + V_{C2} = V_m \sin(\omega t) + V_m \sin(\omega t + 120°) = V_m \sin(\omega t + 60°); \text{ and}$$

$120° \leq \omega t \leq 180°$:

$$V_{AB} = V_{C1} = V_m \sin(\omega t + 120°)$$

where $V_{C1}$ is the voltage on the first capacitor $C_1$, $V_{C2}$ is the voltage on the second capacitor $C_2$, and ω is the angular frequency of the fundamental output, and $V_m$ is the amplitude of inverter output line-to-line voltages, and $V_{AB}$ is the inverter output line-to-line voltage.

The process is repeated in a mirror-image fashion for the 180°-360° interval. Phases B and C voltages are generated similarly, but shifted relative to phase A by 120° and 240° respectively. Table 2 shows the distribution of $V_{C1}, V_{C2}$ voltages between the inverter phases for a complete 360° cycle.

TABLE 2

Distribution of $V_{C1}, V_{C2}$

| | 0-60° | 60°-120° | 120°-180° | 180°-240° | 240°-300° | 300°-360° |
|---|---|---|---|---|---|---|
| A | 0 | $V_{C1}$ | $V_{C1}$ | 0 | $-V_{C2}$ | $-V_{C2}$ |
| B | $-V_{C2}$ | $-V_{C2}$ | 0 | $V_{C1}$ | $V_{C1}$ | 0 |
| C | $V_{C1}$ | 0 | $-V_{C2}$ | $-V_{C2}$ | 0 | $V_{C1}$ |

Table 3 below shows the switching scheme for the inverter switches within one 60 Hz cycle.

TABLE 3

| | Q1 | Q2 | Q3 | Q4 | Q5 | Q6 | Q7 | Q8 | Q9 | Q10 | Q11 | Q12 |
|---|---|---|---|---|---|---|---|---|---|---|---|---|
| 0-60° | | X | X | | | | X | X | X | X | | |
| 60°-120° | X | X | | | | | X | X | | X | X | |
| 120°-180° | X | X | | | | X | X | | | | X | X |
| 180°-240° | | X | X | | X | X | | | | | X | X |
| 240°-300° | | | X | X | X | X | | | | X | X | |
| 300°-360° | | | X | X | | | X | X | | X | X | |

In Table 3, an X in the table indicates a given switch is in the ON state. As can be seen from the DC-DC converter current waveforms 800, 802, DC-DC converter currents are essentially DC with approximately 25% 180 Hz ripple.

Unlike a conventional PWM inverter, in an inventive inverter embodiment switches commutate only once per 60 Hz cycle. Owed to low switching frequency, low-speed devices with lower saturation voltage can be used in the inverter, thus further increasing the inverter efficiency. In addition, capacitors C1, C2 act not as typical DC bus capacitors, but as the inverter output low-pass filter. Note that this filter is significantly simpler and smaller, compared to a conventional low-pass filter due to the absence of the filter inductors and reduced number of filter capacitors, e.g., two instead of three. Unlike the conventional filter, voltage across the capacitors is unipolar, which allows to use smaller, DC-rated capacitors.

It is understood that the inventive inverter is useful for any isolated DC/DC converter topology as current source, modulated DC output can be realized by implementing an appropriate current feedback or by using a converter topology with inherently current source characteristics. Exemplary applications include solid state replacement of conventional utility transformers, distributed power systems, and motor drives. The inventive inverter also can be used with bidirectional energy sources, e.g., as part of a bidirectional inverter.

Figure 9:
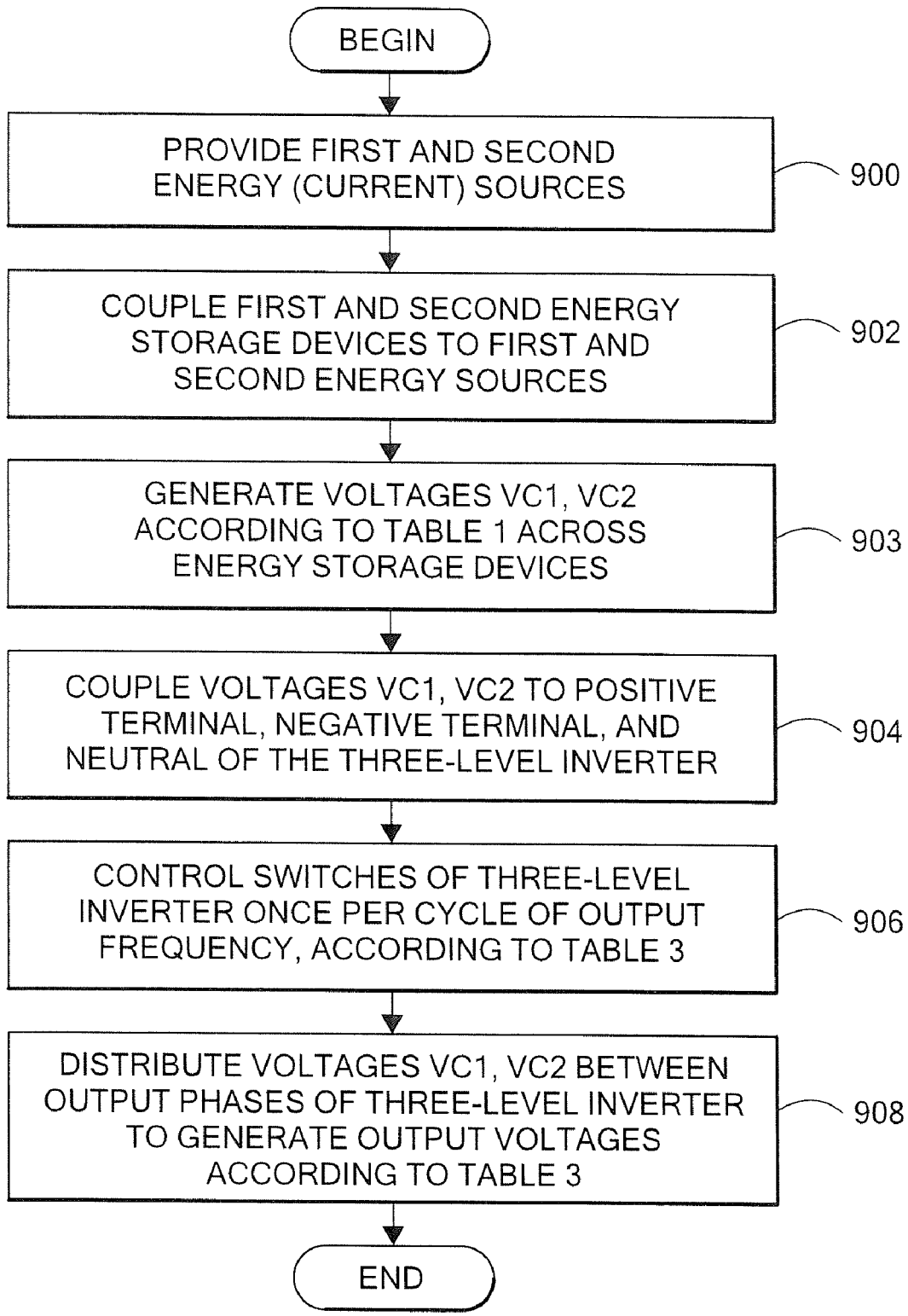
FIG. 9 is a flow diagram showing an exemplary sequence of steps for implementing a three-phase inverter in accordance with exemplary embodiments of the invention.

FIG. 9 shows an exemplary sequence of steps for providing a three phase inverter in accordance with exemplary embodiments of the invention. In step 900, first and second energy sources are provided in series where each of the energy sources has a positive rail, a negative rail, and a neutral. In step 902, the first and second energy storage devices are coupled to the first and second energy sources. Voltages VC1, VC2, such as those listed in Table 1, are generated across energy storage devices, e.g., C1, C2, in step 903. In step 904, voltages VC1, VC2 are coupled to a positive terminal, a negative terminal, and a neutral of a three-level inverter. In step 906, switches of the three-level inverter are controlled once per cycle of output frequency, as shown for example, in Table 3. In step 908, the voltages VC1, VC2 are distributed between output phases of the three-level inverter to generate output voltages, such as according to Table 3.

In one embodiment, the first and second energy sources are current sources. In one particular embodiment, the first and second energy storage devices are capacitors. In one embodiment, the first and second energy sources are bidirectional. In one embodiment, the frequency of the three-phase output signals varies from zero to a predetermined maximum frequency.

Exemplary embodiments of the invention provide a three-phase inverter that utilizes a simple three-phase, three-level inverter for unfolding two modulated DC waveforms into three-phase, sinusoidal voltages. The inventive scheme eliminates the drawbacks of conventional systems, such as Oguchi.

Advantages of the inventive high-frequency linked three-phase inverter include simplicity in use of a single three-phase, three-level inverter instead of two two-level inverters, and reduced size and weight as it does not require a low-frequency transformer.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims.

All publications and references cited herein are expressly incorporated herein by reference in their entirety.

What is claimed is:

1. A circuit, comprising:
   first and second energy sources coupled in series, the first energy source including a first DC-DC converter that generates a first modulated DC waveform on a first energy storage device coupled to the first energy source, the second energy source including a second DC-DC converter that generates a second modulated DC waveform on a second energy storage device coupled to the second energy source, wherein the first DC-DC converter is operably coupled in series with the second DC-DC converter to form a positive rail, a negative rail, and a neutral; and
   a single multi-level inverter coupled to the positive rail, negative rail, and neutral, the multi-level inverter configured to unfold and sum the first and second modulated DC waveforms to produce three-phase sinusoidal output voltages.

2. The circuit according to claim 1, wherein the first and second DC-DC converters comprise respective first and second current source DC-DC converters.

3. The circuit according to claim 2, wherein the first and second energy storage devices are capacitive; the first energy storage device is coupled end-to-end across the positive rail and the neutral; and the second energy storage device is coupled end-to-end across the negative rail and the neutral.

4. The circuit according to claim 1, wherein the three-phase output signals are at a frequency of about 60 Hz.

5. The circuit according to claim 1, wherein the three-phase output signals are at a frequency of about 50 Hz.

6. The circuit according to claim 1, wherein the three-phase output signals are at a frequency of about 400 Hz.

7. The circuit according to claim 1, wherein the frequency of the three-phase output signals varies from zero to a predetermined maximum frequency.

8. The circuit according to claim 1, wherein the inverter includes switches to commutate once per cycle of the output frequency.

9. The circuit according to claim 3, wherein the voltages of the first and second capacitive energy storage devices are described as follows:

|  | ωt | | | | | |
| --- | --- | --- | --- | --- | --- | --- |
|  | 0-60° | 60°-120° | 120°-180° | 180°-240° | 240°-300° | 300°-360° |
| $V_{C1}$ | $V_m\sin(\omega t + 120°)$ | $V_m\sin(\omega t - 60°)$ | $V_m\sin(\omega t)$ | $-V_m\sin(\omega t)$ | $V_m\sin(\omega t - 120°)$ | $V_m\sin(\omega t + 60°)$ |
| $V_{C2}$ | $V_m\sin(\omega t)$ | $V_m\sin(\omega t + 60°)$ | $V_m\sin(\omega t - 120°)$ | $V_m\sin(\omega t - 60°)$ | $V_m\sin(\omega t + 120°)$ | $-V_m\sin(\omega t)$ | where ω is the angular frequency of the fundamental output, $V_{C1}$ is a voltage across the first capacitive energy storage and $V_{C2}$, is a voltage across the second capacitive energy storage, and $V_m$, is an amplitude of the inverter output line-to-line voltages.

10. The circuit according to claim 1, wherein the multi-level inverter output phase voltages are described as follows:

|  | 0-60° | 60°-120° | 120°-180° | 180°-240° | 240°-300° | 300°-360° |
| --- | --- | --- | --- | --- | --- | --- |
| $V_A$ | 0 | $V_{C1}$ | $V_{C1}$ | 0 | $-V_{C2}$ | $-V_{C2}$ |
| $V_B$ | $-V_{C2}$ | $-V_{C2}$ | 0 | $V_{C1}$ | $V_{C1}$ | 0 |
| $V_C$ | $V_{C1}$ | 0 | $-V_{C2}$ | $-V_{C2}$ | 0 | $V_{C1}$ | where ω is the angular frequency of the fundamental output, $V_A, V_B, V_C$ are multi-level inverter output phase voltages, $V_{C1}$ is a voltage across the first capacitive energy storage and $V_{C2}$, is a voltage across the second capacitive energy storage, and $V_m$ is an amplitude of the inverter output phase voltages.

11. The circuit according to claim 1, wherein the first and second energy sources are bidirectional.

12. The circuit of claim 1, wherein the inverter operates at an output frequency and includes switches to commutate once per cycle of the output frequency according to the table that follows:

| | Q1 | Q2 | Q3 | Q4 | Q5 | Q6 | Q7 | Q8 | Q9 | Q10 | Q11 | Q12 |
| --- | --- | --- | --- | --- | --- | --- | --- | --- | --- | --- | --- | --- |
| 0-60° | | X | X | | | | X | X | X | X | | |
| 60°-120° | X | X | | | | | X | X | | X | X | |
| 120°-180° | X | X | | | | X | X | | | | X | X |
| 180°-240° | | X | X | | X | X | | | | | X | X |
| 240°-300° | | | X | X | X | X | | | | X | X | |
| 300°-360 | | X | X | | X | X | | | X | X | | | where an X in the table indicates a switch that is commutated.

13. A method comprising:
   coupling first and second energy sources in series, the first energy source including a first DC-DC converter and the second energy source including a second DC-DC converter, wherein the first DC-DC converter is operably coupled in series with the second DC-DC converter to form a positive rail, a negative rail, and a neutral;
   coupling first and second energy storage devices to the first and second energy sources, such that the first energy storage device is coupled end-to-end across the positive rail and the neutral, and the second energy storage device is coupled end-to-end across the negative rail and the neutral;
   generating a first modulated DC voltage waveform on the first energy storage device and a second modulated DC voltage waveform on the second energy storage device;
   coupling a single three-level inverter to the positive rail, negative rail, and neutral; and
   unfolding and summing the first and second modulated DC waveforms to produce three-phase sinusoidal output voltages at outputs of the three-level inverter.

14. The method according to claim 13, wherein the first and second energy sources are current sources.

15. The method according to claim 13, wherein the first and second energy storage devices are capacitors.

16. The method according to claim 13, wherein the three-phase output signals are at a frequency of about 60 Hz.

17. The method according to claim 13, wherein the three-phase output signals are at a frequency of about 50 Hz.

18. The method according to claim 13, wherein the three-phase output signals are at a frequency of about 400 Hz.

19. The method according to claim 13, wherein the frequency of the three-phase output signals varies from zero to a predetermined maximum frequency.

20. The method according to claim 13, wherein the voltages of the first and second energy storage devices are described as follows:

| | ωt | | | | | |
|---|---|---|---|---|---|---|
| | 0-60° | 60°-120° | 120°-180° | 180°-240° | 240°-300° | 300°-360° |
| $V_{C1}$ | $V_m\sin(\omega t + 120°)$ | $V_m\sin(\omega t - 60°)$ | $V_m\sin(\omega t)$ | $-V_m\sin(\omega t)$ | $V_m\sin(\omega t - 120°)$ | $V_m\sin(\omega t + 60°)$ |
| $V_{C2}$ | $V_m\sin(\omega t)$ | $V_m\sin(\omega t + 60°)$ | $V_m\sin(\omega t - 120°)$ | $V_m\sin(\omega t - 60°)$ | $V_m\sin(\omega t + 120°)$ | $-V_m\sin(\omega t)$ | where ω is the angular frequency of the fundamental output, $V_{C1}$ is a voltage across the first energy storage and $V_{C2}$, is a voltage across the second energy storage, and $V_m$ is an amplitude of the inverter output line-to-line voltages.

21. The method according to claim 13, wherein the inverter operates at an output frequency and includes switches to commutate once per cycle of the output frequency.

22. The method according to claim 13, wherein the inverter operates at an output frequency and includes switches to commutate once per cycle of the output frequency according to the table that follows:

| | Q1 | Q2 | Q3 | Q4 | Q5 | Q6 | Q7 | Q8 | Q9 | Q10 | Q11 | Q12 |
|---|---|---|---|---|---|---|---|---|---|---|---|---|
| 0-60° | | X | X | | | | X | X | X | X | | |
| 60°-120° | X | X | | | | | X | X | | X | X | |
| 120°-180° | X | X | | | | X | X | | | | X | X |
| 180°-240° | | X | | X | X | X | | | | | X | X |
| 240°-300° | | | X | X | X | X | | | | X | X | |
| 300°-360° | | | X | X | | | X | X | X | X | | | where an X in the table indicates a switch is in the ON state.

23. The method according to claim 13, wherein the multi-level inverter output phase voltages result from summation of two voltages $V_{C1}, V_{C2}$ and are described as follows:

| | 0-60° | 60°-120° | 120°-180° | 180°-240° | 240°-300° | 300°-360° |
|---|---|---|---|---|---|---|
| $V_A$ | 0 | $V_{C1}$ | $V_{C1}$ | 0 | $-V_{C2}$ | $-V_{C2}$ |
| $V_B$ | $-V_{C2}$ | $-V_{C2}$ | 0 | $V_{C1}$ | $V_{C1}$ | 0 |
| $V_C$ | $V_{C1}$ | 0 | $-V_{C2}$ | $-V_{C2}$ | 0 | $V_{C1}$ | where ω is the angular frequency of the fundamental output, $V_A, V_B, V_C$ are multi-level inverter output phase voltages, $V_{C1}$ is a voltage across the first energy storage and $V_{C2}$, is a voltage across the second energy storage, and $V_m$ is an amplitude of the inverter output phase voltages.

24. The method of claim 13, further comprising:
configuring the single three-level inverter to unfold and sum the first and second modulated DC waveforms to produce the three-phase sinusoidal output voltages.

25. A method for generating a three-phase output voltage, the method comprising:
providing a first energy source comprising a first DC-DC converter that generates a first modulated DC waveform and a second energy source comprising a second DC-DC converter that generates a second modulated DC waveform, wherein each DC waveform comprises two or more segments, with each segment corresponding to a predetermined portion of a fundamental frequency sinusoid;
coupling the first energy source in series with the second energy source to form a positive rail, a neutral, and a negative rail;
coupling a first energy storage device between the positive rail and the neutral, such that the first energy source generates the first modulated DC waveform on the first energy storage device;
coupling a second energy storage device between the negative rail and the neutral, such that the second energy source generates the second modulated DC waveform on the second energy storage device;
coupling a multi-level inverter to the positive rail, neutral, and negative rail;
configuring the multi-level inverter to unfold and sum each of the first and second modulated DC waveforms in accordance with a predetermined switching scheme; and
generating three-phase sinusoidal output voltages at the multi-level inverter outputs.

26. The method of claim 25, wherein the predetermined portion comprises a 60° segment of the fundamental frequency sinusoid.

27. The method of claim 25, wherein the multi-level inverter operates at an output frequency and includes a plurality of switches configured to operate in accordance with the predetermined switching scheme, which involves commutating the switches once per cycle of the output frequency according to the following table:

| | Q1 | Q2 | Q3 | Q4 | Q5 | Q6 | Q7 | Q8 | Q9 | Q10 | Q11 | Q12 |
|---|---|---|---|---|---|---|---|---|---|---|---|---|
| 0-60° | | X | X | | | | X | X | X | X | | |

-continued

|  | Q1 | Q2 | Q3 | Q4 | Q5 | Q6 | Q7 | Q8 | Q9 | Q10 | Q11 | Q12 |
|---|---|---|---|---|---|---|---|---|---|---|---|---|
| 60°-120° | X | X |  |  |  |  | X | X |  | X | X |  |
| 120°-180° | X | X |  |  |  | X | X |  |  |  | X | X |
| 180°-240° |  |  | X | X |  | X | X |  |  |  | X | X |
| 240°-300° |  |  | X | X | X | X |  |  |  | X | X |  |
| 300°-360° |  |  | X | X |  |  | X | X | X | X |  |  | where an X in the table indicates a switch is in the ON state.

28. The method of claim 25, further comprising distributing voltages associated with the first modulated DC waveform and the second modulated DC waveform between output phases of the multi-level inverter, to generate output voltages according to the table that follows:

|  | 0 - 60° | 60° - 120° | 120° - 180° | 180° - 240° | 240° - 300° | 300° - 360° |
|---|---|---|---|---|---|---|
| $V_A$ | 0 | $V_{C1}$ | $V_{C1}$ | 0 | $-V_{C2}$ | $-V_{C2}$ |
| $V_B$ | $-V_{C2}$ | $-V_{C2}$ | 0 | $V_{C1}$ | $V_{C1}$ | 0 |
| $V_C$ | $V_{C1}$ | 0 | $-V_{C2}$ | $-V_{C2}$ | 0 | $V_{C1}$ | where ω is the angular frequency of the fundamental output, $V_A, V_B, V_C$ are the multi-level inverter output phase voltages, $V_{C1}$ is a voltage across the first energy storage device and $V_{C2}$, is a voltage across the second energy storage device, and $V_m$ is an amplitude of the inverter output phase voltages.

* * * * *